United States Patent
Yang

(10) Patent No.: US 10,701,192 B1
(45) Date of Patent: *Jun. 30, 2020

(54) SYSTEM AND METHOD FOR ENDING VIEW CHANGE PROTOCOL

(71) Applicant: ALIBABA GROUP HOLDING LIMITED, Grand Cayman (KY)

(72) Inventor: Dayi Yang, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/811,037

(22) Filed: Mar. 6, 2020

Related U.S. Application Data

(63) Continuation of application No. 16/735,387, filed on Jan. 6, 2020, which is a continuation of application
(Continued)

(51) Int. Cl.
*G06F 11/07* (2006.01)
*G06F 11/14* (2006.01)
(Continued)

(52) U.S. Cl.
CPC .......... *H04L 69/40* (2013.01); *G06F 11/0796* (2013.01); *G06F 16/1824* (2019.01);
(Continued)

(58) Field of Classification Search
CPC ... G06F 11/1482; G06F 11/182; G06F 11/183
(Continued)

(56) References Cited

U.S. PATENT DOCUMENTS 6,671,821 B1 * 12/2003 Castro .................. G06F 21/577
714/4.3
10,049,017 B2   8/2018 Karame et al.
(Continued)

FOREIGN PATENT DOCUMENTS

CN     107040594 A    8/2017
CN     107579848 A    1/2018
(Continued)

OTHER PUBLICATIONS

"Practical Byzantine Fault Tolerance"—Castro et al, Massachusetts Institute of Technology, Feb. 1999 http://pmg.csail.mit.edu/papers/osdi99.pdf (Year: 1999).*

(Continued)

*Primary Examiner* — Randy A Scott

(57) ABSTRACT

Methods, systems, and apparatus, including computer programs encoded on computer storage media, for performing view change. One of the methods is to be implemented on a blockchain maintained by a number (N) of nodes and performed by a first node of the N nodes that is in a view change protocol. The method includes: obtaining, respectively from at least Q second nodes of the N nodes, at least Q first messages each comprising (1) a consistent current view known to the second node indicating a primary node designated among the N nodes and (2) a consistent current sequence number known to the second node, the current sequence number associated with a latest transaction or a latest block, wherein the current sequence number is larger than a first sequence number known to the first node; and responsive to obtaining the at least Q first messages, ending the view change protocol.

20 Claims, 8 Drawing Sheets

Related U.S. Application Data

No. 16/497,543, filed as application No. PCT/CN2019/078487 on Mar. 18, 2019.

(51) Int. Cl.
| | |
|---|---|
| *G06F 11/18* | (2006.01) |
| *H04L 29/14* | (2006.01) |
| *G06F 16/182* | (2019.01) |
| *H04L 9/06* | (2006.01) |
| *H04L 9/32* | (2006.01) |

(52) U.S. Cl.
CPC .......... *H04L 9/0643* (2013.01); *H04L 9/3247* (2013.01); *H04L 2209/38* (2013.01)

(58) Field of Classification Search
USPC ........ 709/223, 224; 713/168, 170, 171, 178; 380/28, 29, 37, 44
See application file for complete search history.

(56) References Cited

U.S. PATENT DOCUMENTS

| | | |
|---|---|---|
| 2012/0254412 A1 | 10/2012 | Goose et al. |
| 2017/0301047 A1 | 10/2017 | Brown et al. |
| 2018/0025435 A1 | 1/2018 | Karame et al. |
| 2018/0145836 A1 | 5/2018 | Saur et al. |
| 2018/0150835 A1 | 5/2018 | Hunt et al. |
| 2018/0152289 A1 | 5/2018 | Hunt et al. |
| 2018/0158034 A1 | 6/2018 | Hunt et al. |
| 2018/0247320 A1 | 8/2018 | Gauld |
| 2018/0267539 A1 | 9/2018 | Shih |
| 2018/0307573 A1 | 10/2018 | Abraham et al. |
| 2018/0329945 A1 | 11/2018 | Horii et al. |
| 2019/0012662 A1 | 1/2019 | Krellenstein et al. |
| 2019/0018984 A1* | 1/2019 | Setty ..................... H04L 63/123 |
| 2019/0026234 A1 | 1/2019 | Harnik et al. |
| 2019/0036887 A1 | 1/2019 | Miller |
| 2019/0042726 A1 | 2/2019 | Unagami et al. |

FOREIGN PATENT DOCUMENTS

| | | |
|---|---|---|
| CN | 108108967 A | 6/2018 |
| CN | 109039748 A | 12/2018 |

OTHER PUBLICATIONS

Written Opinion of the International Searching Authority and International Search Report for PCT Application No. PCT/CN2019/078487 dated Dec. 17, 2019 (7 pages).

Written Opinion of the International Searching Authority and International Search Report for PCT Application No. PCT/CN2019/078492 dated Nov. 28, 2019 (7 pages).

1st Examination Report for Australian Application No. 2019203861 dated Jan. 15, 2020 (6 pages).

1st Examination Report for Australian Application No. 2019203862 dated Jan. 15, 2020 (6 pages).

Castro, M. et al., "Practical Byzantine Fault Tolerance", Proceedings of the Third Symposium on Operating Systems Design and Implementation, Feb. 1999, pp. 173-186 (14 pages).

Preinterview first office action for U.S. Appl. No. 16/735,457 dated May 7, 2020.

Search Report for European Application No. 19725896.5 dated Apr. 17, 2020.

* cited by examiner

510 

511: obtaining, respectively from at least Q second nodes of the N nodes, at least Q first messages each comprising (1) a consistent current view known to the second node indicating a primary node designated among the N nodes and (2) a consistent current sequence number known to the second node, the current sequence number associated with a latest block or a latest transaction committed by the second node, wherein the current sequence number is larger than a first sequence number known to the first node, Q (quorum) is (N+F+1)/2 rounded up to the nearest integer, and F is (N-1)/3 rounded down to the nearest integer

512: responsive to obtaining the at least Q first messages, ending the view change protocol

SYSTEM AND METHOD FOR ENDING VIEW CHANGE PROTOCOL

CROSS REFERENCE TO RELATED APPLICATION

This application is a continuation application of the U.S. patent application Ser. No. 16/735,387 filed on Jan. 6, 2020, and entitled "SYSTEM AND METHOD FOR ENDING VIEW CHANGE PROTOCOL", which is a continuation application of the U.S. patent application Ser. No. 16/497,543 filed on Sep. 25, 2019, and entitled "SYSTEM AND METHOD FOR ENDING VIEW CHANGE PROTOCOL", which is a national phase application of International Application No. PCT/CN2019/078487, filed on Mar. 18, 2019. The contents of all of the above-referenced applications are incorporated by reference in their entirety.

TECHNICAL FIELD

This application generally relates to methods and devices for performing view change, and in particular, to methods and devices for ending view change in a Practical Byzantine Fault Tolerance (PBFT) system.

BACKGROUND

Practical Byzantine Fault Tolerance (PBFT) is a type of consensus mechanism that can be implemented in distributed systems such as blockchain systems. PBFT consensus mechanism enables a distributed system to reach a sufficient consensus with safety and liveness, despite that certain nodes of the system may fail (e.g., due to poor network connection or otherwise becomes faulty) or propagate incorrect information to other peers (e.g., acting maliciously). The objective of such mechanism is to defend against catastrophic system failures by mitigating the influence of the non-functioning nodes on the correct function of the system and on the consensus reached by the functioning nodes (e.g., non-faulty and honest nodes) in the system.

The PBFT consensus mechanism focuses on providing a practical Byzantine state machine replication that tolerates Byzantine faults (e.g., non-functioning nodes) through an assumption that there are independent node failures and manipulated messages propagated by specific and independent nodes. In this PBFT consensus mechanism, for example, all nodes in a blockchain system are ordered in a sequence with one node being the primary node (also known as the leader or master node) and the others referred to as the backup nodes (also known as follower nodes). All of the nodes within the system communicate with each other and the goal is for all honest nodes to come to an agreement/consensus on a state of the system.

For instance, for the PBFT consensus mechanism to work, the assumption is that the amount of non-functioning nodes in a blockchain system cannot simultaneously equal or exceed one third of the overall nodes in the system in a given window of vulnerability. The method effectively provides both liveness and safety as long as at most F nodes are non-functioning nodes at the same time. In other words, in some implementations, the number F of non-functioning nodes that can be tolerated by the PBFT consensus mechanism equals $(N-1)/3$, rounded down to the nearest integer, wherein N designates the total number of nodes in the system. In some implementations, a blockchain system implementing the PBFT consensus mechanism can handle up to F Byzantine faults where there are at least 3F+1 nodes in total. To perform consensus verifications, each node executes a normal operation protocol under the leadership of the primary node. When a node thinks that the primary node is non-functioning, the node may enter a view change protocol to initiate a change of the primary node. After a new primary node replaces the non-functioning primary node under an agreement by a majority of nodes, the nodes switch back to the normal operation protocol.

In current technologies, a node exits the view change protocol according to the traditional procedure: waiting for a majority of nodes to also enter the view change protocol and agree that the primary node is non-functioning. In the traditional view change protocol, this condition is that when at least 2F+1 nodes enter the view change protocol and multicast the view change message respectively, the new primary node obtaining at least 2F+1 view change messages multicasts the new view message to help the nodes get back to normal operation. However, in some cases, network communication disruption may cause a node to mistakenly determine that the primary node is non-functioning and enter the view change protocol while the other nodes still in normal operation. As a result, the node is stuck in the view change protocol and effectively shut out of the consensus process. The delay before bringing the stuck node back to normal operation is unpredictable, because it may depend on when a real primary node break-down or malfunction happens. Thus, the stuck node's computing power is wasted while waiting for other nodes to join the view change. Thus, it is desirable to provide an alternative mechanism that can help nodes to exit the view change protocol.

SUMMARY

Various embodiments of the specification include, but are not limited to, systems, methods, and non-transitory computer readable media for performing view change.

According to one embodiment, a computer-implemented view change method to be implemented on a blockchain maintained by a number (N) of nodes is performed by a first node of the N nodes that is in a view change protocol. The method comprises: obtaining, respectively from at least Q second nodes of the N nodes, at least Q first messages each comprising (1) a consistent current view known to the second node indicating a primary node designated among the N nodes and (2) a consistent current sequence number known to the second node, the current sequence number associated with a latest block or a latest transaction committed by the second node, wherein the current sequence number is larger than a first sequence number known to the first node, Q (quorum) is $(N+F+1)/2$ rounded up to the nearest integer, and F is $(N-1)/3$ rounded down to the nearest integer; and responsive to obtaining the at least Q first messages, ending the view change protocol.

In some embodiments, obtaining the at least Q first messages comprises: obtaining, respectively from the at least Q second nodes, at least Q commit messages indicating that the at least Q second nodes agree upon a next block to add to the blockchain, the Q commit messages respectively comprising the Q first messages.

In other embodiments, obtaining the at least Q first messages comprises: obtaining, respectively from the at least Q second nodes, at least Q commit messages indicating that the at least Q second nodes agree upon a next block to add to the blockchain, the Q first messages respectively appended to the Q commit messages.

In yet other embodiments, the current sequence number comprises a height of a second copy of the blockchain maintained by the second node; and the first sequence number comprises a height of a first copy of the blockchain maintained by the first node.

In still other embodiments, the current sequence number comprises a sequence number of the latest transaction committed by the second node; and the first sequence number comprises a sequence number of a latest transaction committed by the first node.

In some embodiments, the first message comprises a digital signature certifying the current view and the current sequence number both known to the second node.

In other embodiments, the first message further comprises a digest of the latest block or the latest transaction.

In yet other embodiments, the digest comprises a hash value of the latest block or the latest transaction.

In still other embodiments, the digest comprises a Merkle root of the latest block known to the second node but unknown to the first node.

In some embodiments, ending the view change protocol comprises: synchronizing a first copy of the blockchain maintained by the first node with a second copy of the blockchain maintained by the second node; and exiting the view change protocol to enter a normal operation protocol using the consistent current view for the first node.

In other embodiments, the current sequence number known to the at least Q second nodes is (n+1); and the first sequence number known to the first node is n.

In yet other embodiments, the current view for the at least Q second nodes is v; and when in the view change protocol, the first node has a first view larger than v.

In still other embodiments, the N nodes form a Practical Byzantine Fault Tolerance (PBFT) network, in which one of the N nodes acts as the primary node and the other (N−1) nodes act as backup nodes.

In some embodiments, a view change system comprises: one or more processors; and one or more computer-readable memories coupled to the one or more processors and having instructions stored thereon that are executable by the one or more processors to perform the method of any of the preceding embodiments.

In other embodiments, a view change apparatus comprises a plurality of modules for performing the method of any of the preceding embodiments.

According to another embodiment, a view change system is for maintaining a blockchain, wherein a number (N) of nodes maintain the blockchain, the system acting as a first node of the N nodes that is in a view change protocol. The system comprises one or more processors and one or more non-transitory computer-readable memories coupled to the one or more processors and configured with instructions executable by the one or more processors to cause the system to perform operations comprising: obtaining, respectively from at least Q second nodes of the N nodes, at least Q first messages each comprising (1) a consistent current view known to the second node indicating a primary node designated among the N nodes and (2) a consistent current sequence number known to the second node, the current sequence number associated with a latest block or a latest transaction committed by the second node, wherein the current sequence number is larger than a first sequence number known to the first node, Q (quorum) is (N+F+1)/2 rounded up to the nearest integer, and F is (N−1)/3 rounded down to the nearest integer; and responsive to obtaining the at least Q first messages, ending the view change protocol.

According to yet another embodiment, a non-transitory computer-readable storage medium is for maintaining a blockchain, wherein a number (N) of nodes maintain the blockchain, the storage medium being associated with a first node of the N nodes that is in a view change protocol. The storage medium is configured with instructions executable by one or more processors to cause the one or more processors to perform operations comprising: obtaining, respectively from at least Q second nodes of the N nodes, at least Q first messages each comprising (1) a consistent current view known to the second node indicating a primary node designated among the N nodes and (2) a consistent current sequence number known to the second node, the current sequence number associated with a latest block or a latest transaction committed by the second node, wherein the current sequence number is larger than a first sequence number known to the first node, Q (quorum) is (N+F+1)/2 rounded up to the nearest integer, and F is (N−1)/3 rounded down to the nearest integer; and responsive to obtaining the at least Q first messages, ending the view change protocol.

According to still another embodiment, a view change apparatus is for maintaining a blockchain, wherein a number (N) of nodes maintain the blockchain, the apparatus acting as a first node of the N nodes that is in a view change protocol. The apparatus comprises an obtaining module for obtaining, respectively from at least Q second nodes of the N nodes, at least Q first messages each comprising (1) a consistent current view known to the second node indicating a primary node designated among the N nodes and (2) a consistent current sequence number known to the second node, the current sequence number associated with a latest block or a latest transaction committed by the second node, wherein the current sequence number is larger than a first sequence number known to the first node, Q (quorum) is (N+F+1)/2 rounded up to the nearest integer, and F is (N−1)/3 rounded down to the nearest integer; and an ending module for, responsive to obtaining the at least Q first messages, ending the view change protocol.

Embodiments disclosed in the specification have one or more technical effects. In some embodiments, the methods and systems can ensure that a node (e.g., a first node) of a PBFT consensus system that has entered a view change protocol can efficiently exit the view change protocol and resume the normal operation protocol. In other embodiments, when a second node in the normal operation protocol multicasts a commit message, it may add or append a first message to the commit message, the first message comprising a current view and a current sequence number known to the second node. The current view indicates the second node's view of primary node, and the current sequence number indicates the second node's latest committed transaction(s) or a height of the blockchain (also known as block height) associated with latest block(s) of the blockchain maintained by the second node. In yet other embodiments, the first node stuck in the view change protocol can obtain the current view and current sequence number from the first message. Upon receiving a quorum number Q of consistent first messages, the first node may compare them with its own view and sequence number to determine if a majority of the nodes are still in normal operation. If the majority of other nodes are still in normal operation, the first node may end the view change protocol and resume the normal operation protocol. In still other embodiments, as indicated by the sequence number in the first messages, the majority of nodes may have agreed upon a next transaction or a next block in the consensus verification sequence, the next transaction or next block not yet recognized by the first node. By realizing that the majority of nodes did not enter view change, the first node can smoothly end the view change protocol. In some embodiments, the first node can end view change even if the majority of nodes do not also enter view change and agree upon a new view to end the view change protocol. The number of nodes in normal operation and contributing their computing power can thus be optimized.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

BRIEF DESCRIPTION OF THE DRAWINGS

FIG. 5A illustrates a flow chart of a view change method, in accordance with various embodiments.

DETAILED DESCRIPTION

Embodiments disclosed herein include, but are not limited to, view change systems, methods, and non-transitory computer readable media that can be implemented in PBFT systems. In various embodiments, a pathway to exit the view change protocol and resume the normal operation protocol is provided. A node that has entered view change can be brought back to normal operation without going through the traditional view change protocol, which requires at least Q nodes to enter view change. Q (quorum) is $(N+F+1)/2$ rounded up to the nearest integer, N represents the total number of nodes and is an integer no less than four, and F is $(N-1)/3$ rounded down to the nearest integer. Similar to PBFT, the disclosed systems, methods, and non-transitory computer readable media can be applied to other consensus protocols such as SecureRing, Byzantine Paxos, Q/U, HQ, Zyzzyva, ABsTRACTs, RBFT, Adapt, Tangaroa, Cheap-BFT, MinBFT, FastBFT, etc. Various aspects of PBFT can be referred to M. Castro, B. Liskov, "Practical Byzantine Fault Tolerance," Proceedings of the Third Symposium on Operating Systems Design and Implementation, (February 1999), which is incorporated by reference herein in its entirety.

Figure 1:
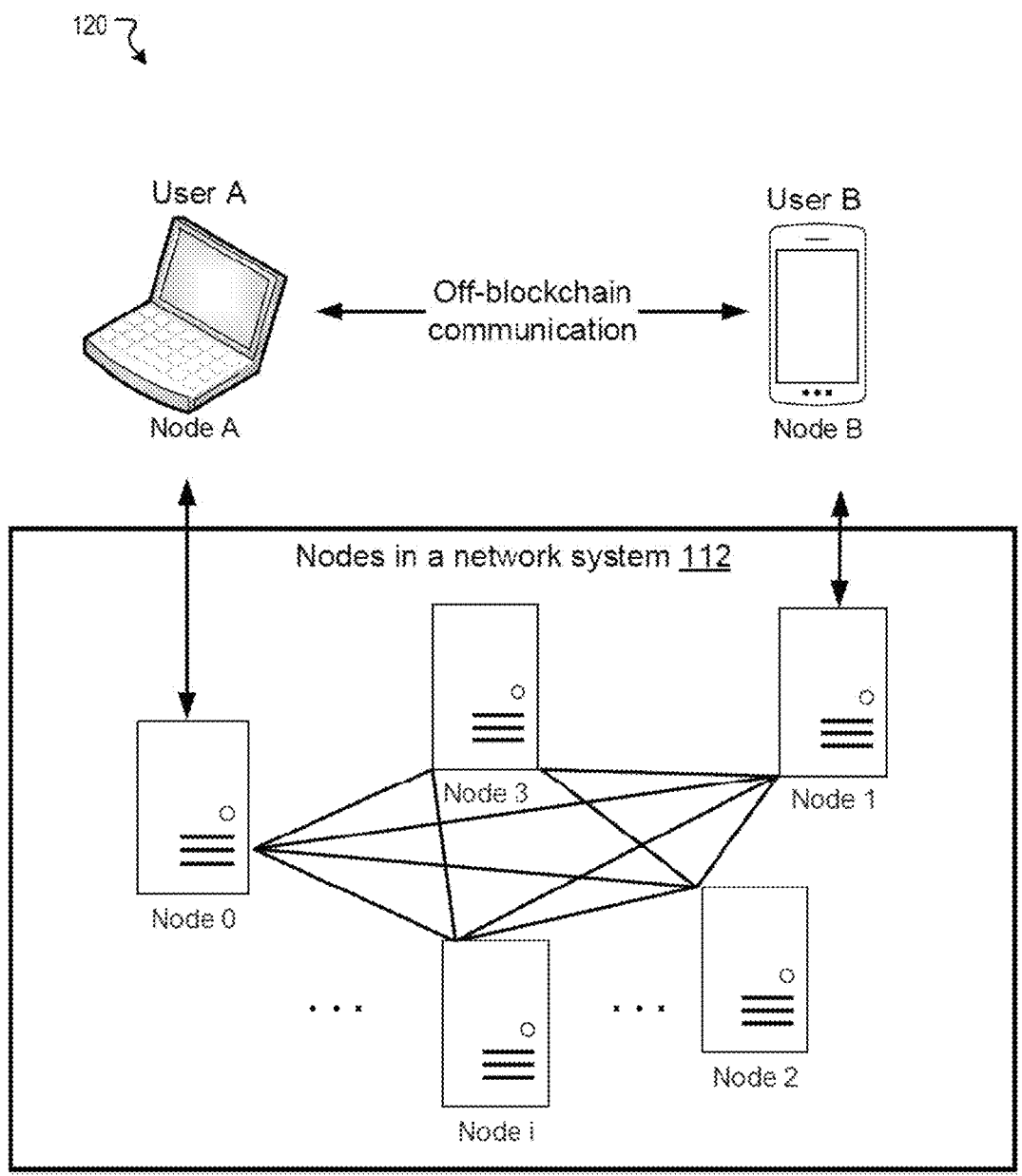
FIG. 1 illustrates a network, in accordance with various embodiments.

FIG. 1 shows a network 120, in accordance with various embodiments. The components presented below are intended to be illustrative. As shown, the network 120 may comprise a network system 112. The network system 112 may comprise one or more nodes (e.g., node 0, node 1, node 2, node 3, node 4, node i, etc.) implemented in one or more computing devices such as servers, computers, mobile phones, etc. The network system 112 may be installed with appropriate software (e.g., consensus program) and/or hardware (e.g., wires, wireless connections) to access other devices of the network 120 or additional systems. The node may include one or more processors and one or more memories coupled to the one or more processors. The memories may be non-transitory and computer-readable and be configured with instructions executable by one or more processors to cause the one or more processors to perform operations described herein. Although the nodes are shown as single components in this figure, it will be appreciated that these nodes can be implemented as single devices or multiple devices coupled together. In general, nodes may be able to communicate with one another and other devices outside the network system 112. For example, through one or more wired or wireless networks (e.g., the Internet), data can be communicated.

In various embodiments, the network system 112 may be implemented as a blockchain network system comprising various blockchain nodes. As shown, the blockchain network system may comprise a plurality of blockchain nodes (e.g., node 0, node 1, node 2, node 3, node 4, node i, etc.). The blockchain nodes may form a network (e.g., peer-to-peer network) with one blockchain node communicating with another. The order and the number of the blockchain nodes as shown are merely examples and for the simplicity of illustration. The blockchain nodes may be implemented in servers, computers, etc. Each blockchain node may correspond to one or more physical hardware devices or virtual devices coupled together via various types of communication methods such as TCP/IP. Depending on the classifications, the blockchain nodes may comprise full nodes, Geth nodes, consensus nodes, etc.

In various embodiments, the blockchain network system may interact with other systems and devices such as node A and node B (e.g., lightweight nodes). The interactions may involve transmission and reception of data for the purpose of, for instance, receiving a request and returning an execution result of the request. In one example, user A may want to transact with user B over the blockchain network. The transaction may involve transferring some asset in user A's account to user B's account. User A and user B may use respective devices node A and node B installed with an appropriate blockchain software (e.g., cryptocurrency wallet) for the transaction. Node A may access the blockchain through communication with node 0, and node B may access the blockchain through communication with node 1. For example, node A may submit a transaction request to the blockchain through node 0, and node B may submit a smart contract execution request to the blockchain through node 1. Off the blockchain, node A and node B may have other channels of communication (e.g., regular internet communication without going through nodes 0 and 1).

The blockchain nodes may each comprise or couple to a memory. In some embodiments, the memory may store a pool database. The pool database may be accessible to the plurality of blockchain nodes in a distributed manner. For example, the pool database may be respectively stored in the memories of the blockchain nodes. The pool database may store a plurality of transactions submitted by the one or more user devices such as nodes A and B operated by users.

The blockchain nodes form a network (e.g., P2P network) that, through consensus, records transactions in a distributed ledger known as blockchain. The participants of a P2P network may be referred to as nodes, which maintain the blockchain. In a blockchain P2P network, each node participates in consensus verifications and stores a complete ledger copy of the blockchain. Every node confirms batches of transactions by a blockchain consensus method to ensure that all nodes have consistent confirmation results and thus consistent copies of the blockchain.

One of the blockchain consensus methods is Practical Byzantine Fault Tolerance (PBFT). Byzantine fault tolerance originates from the Byzantine general problem. For a P2P network system, as long as the number of such non-functioning nodes is within a certain limit, the system can continue functioning properly. Such system is called Byzantine fault tolerant system. PBFT is an example of an optimization of the Byzantine Fault Tolerance network ability. PBFT provides the network with a Byzantine state machine, by copying servers and synchronizing client interactions with server copies.

At the center of the PBFT operation is the maintenance of the consistent global view of the information recorded on the blockchain, which forms the backbone for enabling users to interact with each other in a decentralized manner. The security of the PBFT consensus model is critical to a blockchain platform. The two key properties of a consensus model are: 1) safety or consistency: all honest nodes produce the same valid output; and 2) liveness: all honest nodes in consensus eventually produce a value without being stalled at an intermediate step. A secure and robust PBFT consensus protocol needs to tolerate a wide variety of Byzantine behaviors, including failures of network nodes, partition of the network, message delay, out-of-order message delivery, message corruption, and the like and reach consensus in nodes as long as the number of non-functioning nodes within the system is limited. To that end, the PBFT model works under either one of two mutually exclusive protocols: normal operation/consistency protocol and view change protocol that are further described below. In this specification, non-functioning means faulty and/or malicious, and functioning means non-faulty and honest. Possible fault or malicious acts may include: failure to delivery message, message delivery delay, out-of-order message delivery, Byzantine faults (delivering arbitrary messages to different nodes, violating the protocol), etc.

In some embodiments, a Practical Byzantine Fault Tolerance (PBFT) system may comprise N nodes, with one of the N nodes acting as a primary node and the other of the N nodes acting as backup nodes. The primary node designation may not be fixed to a particular node, as another node may be elected to become a new primary node through the view change protocol. For example, the primary node may be elected through a modulo operation, in which a functioning node with the lowest serial number (modulo view number) becomes the new primary node. The current view and the total number of nodes N may determine the primary node id=(view+1) mod N. In PBFT, the view is changed each time a new primary node is elected. For example, with each view change, the view increases monotonically from zero. That is, the view may change with a change in the primary node.

In some embodiments, the primary node is functioning at view v, and the normal operation protocol is executed. For the normal operation, the primary node and/or the backup nodes may receive requests associated with unverified transactions from one or more clients. For example, node A as a client may submit a request to the primary node and/or the backup nodes. The requests may include the unverified transactions (e.g., transactions to be added to a new block in blockchain). The unverified transactions may include, for example, blockchain-based financial transactions, smart contract deployment or execution transactions, etc. The primary and backup nodes may or may not perform some preliminary verification of the transactions. The backup nodes that receive the requests may forward the received requests to the primary node. Once the transactions at the primary node reach a certain level or otherwise meets a triggering condition, the primary node may initiate a round of consensus verification and propose a verification result for the unverified transactions. The backup nodes may respond to the consensus and confirm the proposal to reach a consensus. The requirements for the nodes are that they are deterministic and start in the same state. The final result is that all honest nodes come to a consensus on the order of the record and they either accept it or reject it. Once consensus-verified, the transactions may be packed into a new block of the blockchain and added to the local blockchain copies maintained by the nodes. Also, the clients (e.g., node A) that originally sent the requests are notified.

Figure 2A:
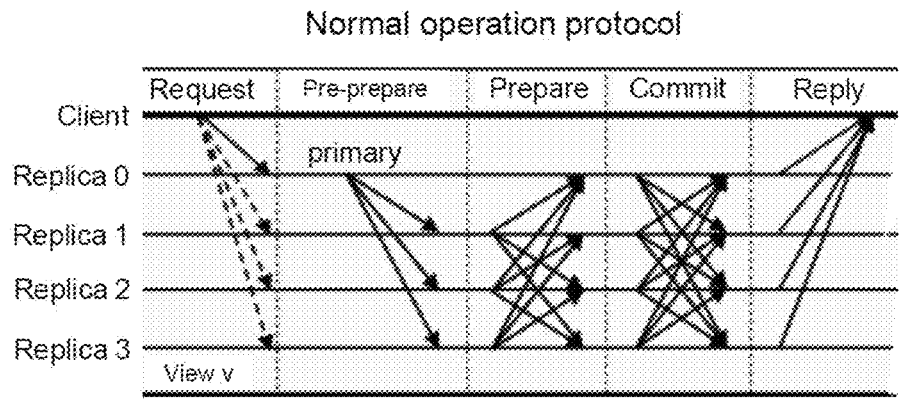
FIG. 2A illustrates a normal operation protocol of PBFT.
Figure 2B:
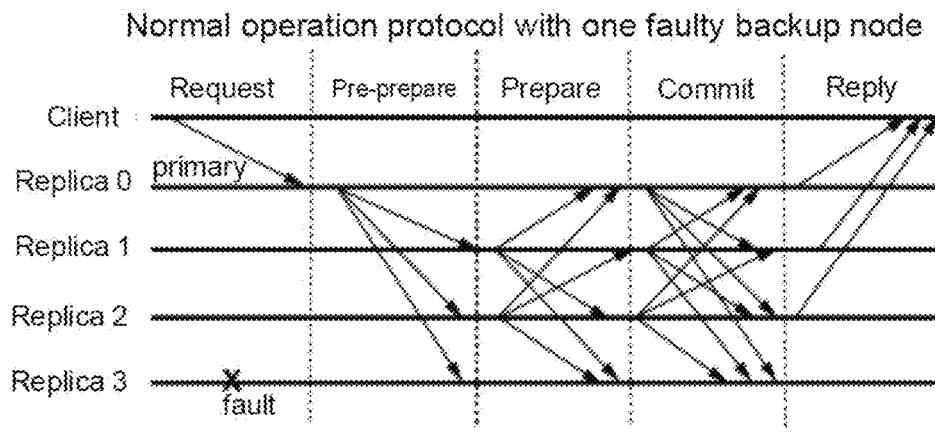
FIG. 2B illustrates a normal operation protocol of PBFT with one non-functioning replica.
Figure 2C:
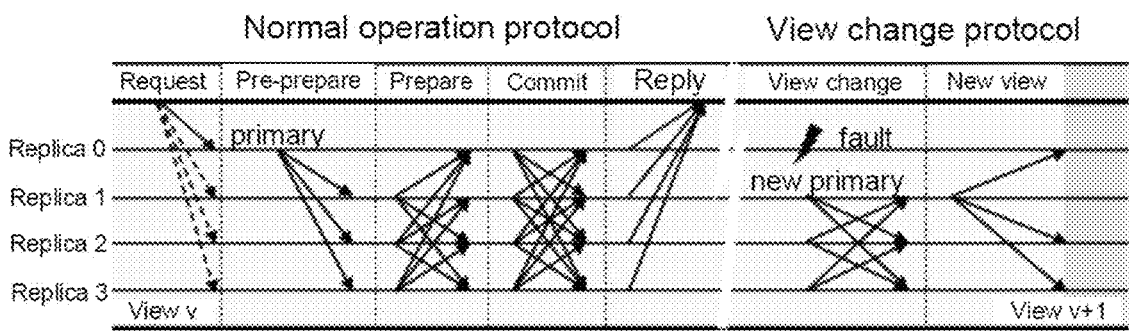
FIG. 2C illustrates a normal operation protocol and a view change protocol of PBFT.

To preserve safety, the main PBFT method comprises three phases for the normal operation protocol: pre-prepare, prepare, and commit. Referring to FIG. 2A to FIG. 2C, an example of a PBFT system comprises four replicas (replica being another term for node): replica 0, replica 1, replica 2, and replica 3. The numbers 0 to 3 are replica serial numbers that may be used to determine a new primary node. Replica 0 may correspond to primary node 0, and replicas 1, 2, and 3 may correspond to backup nodes 1, 2, and 3. The replicas may be implemented, for example, in various blockchain nodes of the network system 112 described above. A normal operation protocol is shown in FIG. 2A with no non-functioning node present, and another normal operation protocol is shown in FIG. 2B with replica 3 being a non-functioning node. For both situations, the normal operation protocol may be divided into a request phase, a pre-prepare phase, a prepare phase, a commit phase, and a reply phase.

Referring to FIG. 2A and FIG. 2B, the normal operation begins in the request phase when a client submits a request (message) to the primary node (replica 0), which is responsible for advocating for the request. The request may comprise information of the client, a request operation (e.g., a transaction request for consensus verification), and a request timestamp. The client (also referred to as a client node) may be implemented, for example, in node A described above. Node A may be a lightweight node (e.g., implemented in a mobile phone). Additionally or alternatively, the client may submit the request to a backup node, which forwards the request to the primary node before the pre-prepare phase. Regardless whether the primary or backup node receives the request, the corresponding node may multicast the received request to the other nodes in the network. Thus, the primary node may end up obtaining the pending requests submitted by the clients to the consensus network one way or another.

Accordingly, the primary node acts like a leader and leads the backup nodes to verify the transactions associated with the requests. The primary node is responsible for ordering execution of requests within its view. In the pre-prepare phase, the primary node may validate the obtained requests and propose a sequence number for each of the requests.

Thus, the requests may each be assigned an increasing sequence number and thus put in order. Additionally, the pre-prepare message may comprise a block height. The block height may be based on a current height of the blockchain. For example, if the blockchain currently has 1000 blocks, the block height may be 1000 indicating that 1000 blocks already exist in the blockchain, or may be 1001 indicating that the transactions associated with the requests are proposed to be packed into the $1001^{th}$ block of the blockchain, which is yet to be verified by other nodes. The primary node may forward the requests along with the sequence numbers and/or the block height. For example, after obtaining the requests, the primary node may arrange the requests in an order for executing the corresponding transactions by assigning the sequence numbers and store to a list. The primary node may send a pre-prepare message to every backup node (replica 1 to replica 3) in the PBFT network system. As shown in FIG. 2A, the primary node may multicast the list in or along with the pre-prepare message to the backup nodes. As shown in FIG. 2B, even if a backup node (replica 3) is non-functioning and the primary node is unaware of that, the primary node may still send the pre-prepare message. Each backup node accepts the pre-prepare message so long as it is valid. The pre-prepare message may contain a view number, sequence numbers, signatures, a digest (d), other meta data, and the like, which allow determination of the validity of the message.

In the prepare phase, if a backup node accepts the pre-prepare message, it may follow up by multicasting a prepare message to other nodes in the PBFT network system including the primary node. Multicasting the prepare message indicates that the sender node agrees to the order. Each prepare message is accepted by the receiving node as long as being valid. The validity of the prepare message can be similarly determined based on the view number, sequence number, signatures, a digest (d), other meta data, and the like. A node is prepared if it has received the original request from the primary node, has pre-prepared (e.g., by multicasting the pre-prepare message), and has obtained at least (Q-1) distinct, valid, and consistent prepare messages that match the pre-prepare message. The (Q-1) prepare message may include the multicast prepare message. Q (quorum) is (N+F+1)/2 rounded up to the nearest integer, N represents the total number of nodes and is an integer no less than four, and F is (N−1)/3 rounded down to the nearest integer. The PBFT network system of Q nodes can tolerate up to F Byzantine faults. In some embodiments, when N is at least (3F+1), Q is (2F+1). Here, (Q-1) instead of Q prepare messages are needed because the pre-prepare message can be treated as an equivalent of a prepare message of the primary node (although the primary node may not send the prepare message per se). If counting the pre-prepare message as one more prepare message, then there would be at least Q distinct and valid prepare messages indicating that at least Q of all nodes accepted the pre-prepare message, of which up to F non-functioning nodes can be tolerated. Thus, the pre-prepare to prepare phase ensures that at least (Q-F) functioning nodes (Q prepared nodes but accounting for up to F non-functioning nodes) agree that if a request is executed in view v, it will be executed with its sequence number. The prepare phase ensures fault-tolerant consistent ordering of each request within views.

In some embodiments, after receiving the pre-prepare message and (Q-1) prepare messages, the backup node may verify the order and compare the verification result with a proposed verification result written by the primary node in the pre-prepare message. There may be a number of ways to verify the order. For example, the proposed verification result may comprise a proposed Merkle Patricia Trie root written into the digest (d). The backup node may arrange the transactions associated with the requests according to the order and compute a Merkle Patricia Trie root to compare with the proposed Merkle Patricia Trie root. The computation may also require certain existing information such as node hash of existing blocks in the blockchain. The comparison yields a digest (D(m)) calculated by the backup node. If the digest (D(m)) is consistent with the digest (d), the verification succeeds. Once verified, the backup node may agree to the ordering of the requests (e.g., the order for packing the transactions associated with the requests into a new block of the blockchain). Similarly, the backup node may verify if the commit messages (described below with respect to the commit phase) it receives comprise the same digest D(m) to determine if other nodes also agree to the ordering of the requests. If a prepared node has obtained Q commit messages and all requests with lower sequence numbers have been executed, the node may execute the request.

In some embodiments, the pre-prepare message may comprise a digest (d) of the new block or information otherwise related to executing the requests (e.g., transactions associated with the requests). The digest (d) (e.g., a hash value) may be the numeric result of applying a hash algorithm to the data such as the transactions. The backup node may execute the transactions to confirm the digest (d). For a plurality of requests, the backup node may execute the requests according to the order (that is, the sequence numbers of the requests) to obtain a digest D(m). If D(m) and d are consistent, the backup node multicasts a commit message (described below with respect to the commit phase) which indicates that backup node agrees with the validation result of the primary node. In some embodiments, the commit message indicates that the backup node that multicast the commit message agrees to the pre-prepare message and has obtained (Q-1) or more valid and consistent prepare messages from distinct nodes. For a pending request of a certain sequence number, if a prepared node has obtained Q commit messages and all requests with lower sequence numbers have been executed, the node may execute the request.

In the commit phase, if a node is prepared, it may multicast a commit message to other nodes. The node may receive commit messages from other nodes. Each node accepts the commit message so long as it is valid. The commit message may contain a view number, sequence numbers, signatures, a digest, other meta data, and the like, which allow determination of the validity of the message. If a node has obtained at least Q distinct, valid, and consistent commit messages, it indicates that a quorum number of nodes have committed (that is, at least (Q-F) honest nodes are prepared) and consensus has been reached. The at least Q valid commit messages may include the multicast commit message. Thus, the prepare to commit phase ensures that at least (Q-F) functioning nodes agree (Q commit messages but accounting for up to F non-functioning nodes) that a request will be eventually executed in view v with its sequence number. Since the nodes may commit in different views (e.g., when some nodes have already entered a new view and some other nodes remain in the previous view), the commit messages received may correspond to commits performed in different views. The commit phase ensures fault-tolerant consistent ordering of each request across views as functioning nodes agree on the sequence number of the each request.

In some embodiments, if a node has obtained at least Q distinct, valid, and consistent commit messages, the node may execute the corresponding request(s). For example, once Q commit messages have been obtained, it means that the new block is consensus-verified. Thus, the node may pack the new block into the locally maintained copy of blockchain. Otherwise, the backup node may directly trigger the view change protocol.

In the reply phase, after the execution of the request(s), the node sends out a reply directly to the client. For a transaction packed into the blockchain, the reply may comprise an address of the transaction in the blockchain. Because up to F faults are allowed, the client waits for (Q-F) replies with valid signatures from different nodes and with the same request timestamp and the same result of execution before accepting the result. For the PBFT network system shown in FIG. 2A and FIG. 2B, there are four total nodes, so at most one (N=4, Q=3, and F=1) non-functioning node can be tolerated. Thus, even with replica 3 being non-functioning, the consensus can still be reached in FIG. 2B.

To preserve liveness, the primary node can be replaced in a view change protocol if a specific amount of time has passed without the primary node multicasting the request. For example, the backup node may maintain a timer. The backup node starts the timer when it receives a request and the timer is not already running. The backup node stops the timer when it is no longer waiting to execute the request (i.e., the request is executed), but restarts the timer if at that point it is waiting to execute one or more other requests. If the timer expires, the backup node may determine that the primary node is non-functioning. Thus, the backup node may multicast a view change message to other nodes. For another example, the backup node may determine that the primary node is non-functioning. Thus, the backup node may multicast a view change message. For another example, the client may use a timer to determine if too much time has passed after client sends the request to the primary node without receiving a response. When this timer expires, the client sends its request to all nodes. If a node already knows about the request, the rebroadcast is ignored. If the node does not know about the request, it will start a timer. On timeout of the node's timer, the node starts the view change process by multicasting the view change message to other backup nodes based on the suspicion that the primary node is non-functioning. The view change message includes the system state (in the form of archived messages including the prepare message of its own during the previous normal operation), so that other nodes will know that the sender node has not failed.

Figure 3A:
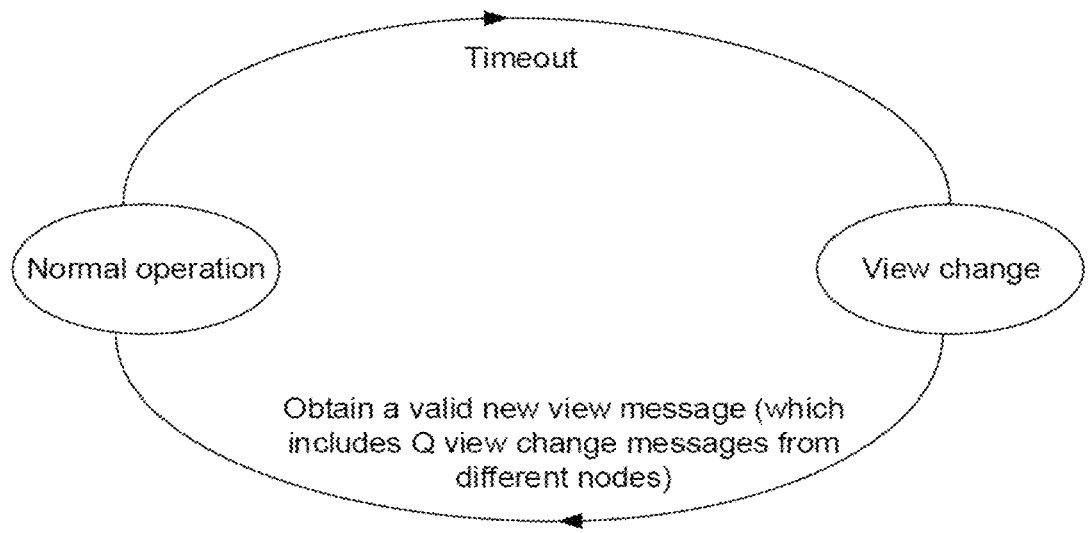
FIG. 3A illustrates a flow chart of switching pathways between normal operation protocol and view change protocol.

A supermajority of honest nodes can decide whether a primary node is non-functioning and remove it with the next primary node in line as the replacement. View change occurs when enough nodes believe that the primary node has failed. A portion of FIG. 2C shows the view change protocol. Referring to FIG. 2C, under the view change phase, if the current view is v, node p=(v+1) mod N waits for obtaining Q valid view change messages to become the new primary node, where p is the replica/node serial number, v is the view number, N is the total number of replicas/nodes. The Q view change messages may include the multicast view change message. Since the previous view is v, the view change messages may each comprise a new view v+1. Once new primary node p has obtained Q view change messages, it multicasts a new view message. This message contains all the valid view change messages received as well as a set of all requests that may not have been completed yet due to primary node failure. The new primary node may decide on the latest checkpoint and ensure, among other things, that functioning nodes are caught up with the latest states, which may involve re-committing previous requests (e.g., prepared, committed, but not executed requests) in the new view. While the view change is occurring, no new requests are accepted. After a node receives a valid new view message including the Q view change messages, it enters view v+1 and processes the set of uncompleted requests. Thereafter, the normal operation protocol proceeds, and the nodes redo the requests between the sequence number of the latest stable checkpoint and the highest number in a prepare message, but avoid re-executing requests. The corresponding switching of status for a node between the normal operation protocol and the view change protocol is illustrated in FIG. 3A. As shown in FIG. 3A, for example, a timeout for a backup node may trigger a switch from the normal operation protocol (e.g., during any phase of the normal operation protocol) to the view change protocol (e.g., starting the view change phase). After executing the view change protocol, once obtaining a valid new view message, the backup node may exit the view change protocol and resume the normal operation protocol to execute the pending requests. The valid new message may include the Q view change messages from different nodes.

Figure 3B:
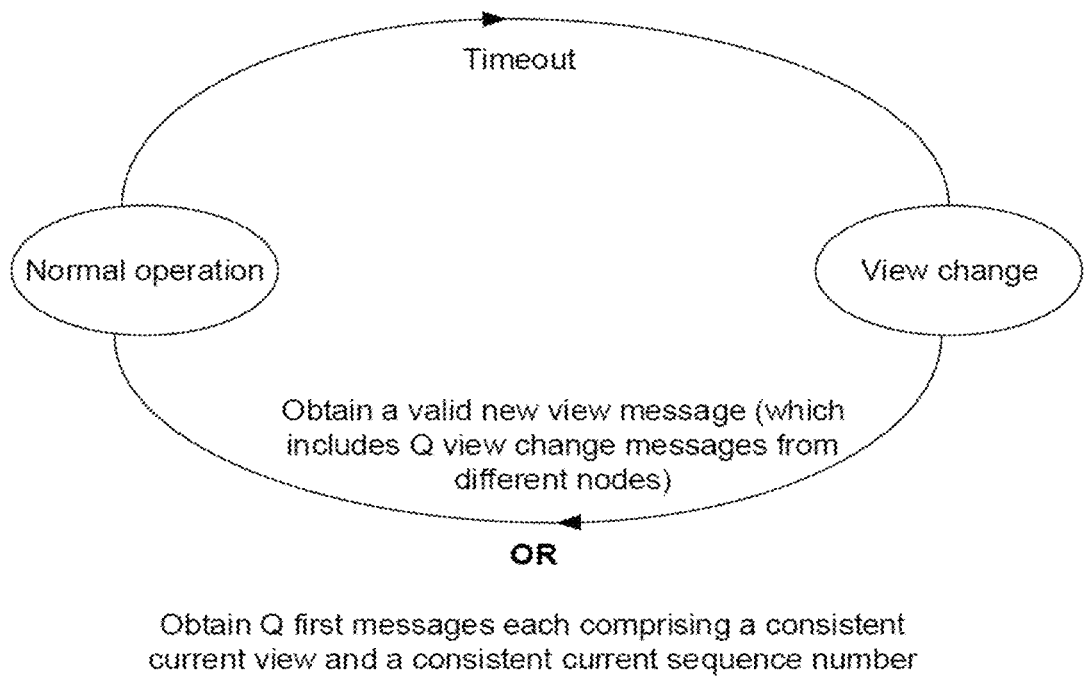
FIG. 3B illustrates a flow chart of switching pathways between normal operation protocol and view change protocol, in accordance with various embodiments.

As shown in FIG. 3B, an alternative pathway may be provided for the node to switch from the view change protocol to the normal operation protocol, according to various embodiments. In some embodiments, the node in the view change protocol may obtain Q first messages to end the view change protocol. The first message may include a current view, a current sequence number, and/or a digest. Based on the first messages, the node in the view change protocol may determine that the majority of other nodes are in normal operation and thus exit view change. More details are described below with reference to FIG. 4 to FIG. 6.

Figure 4:
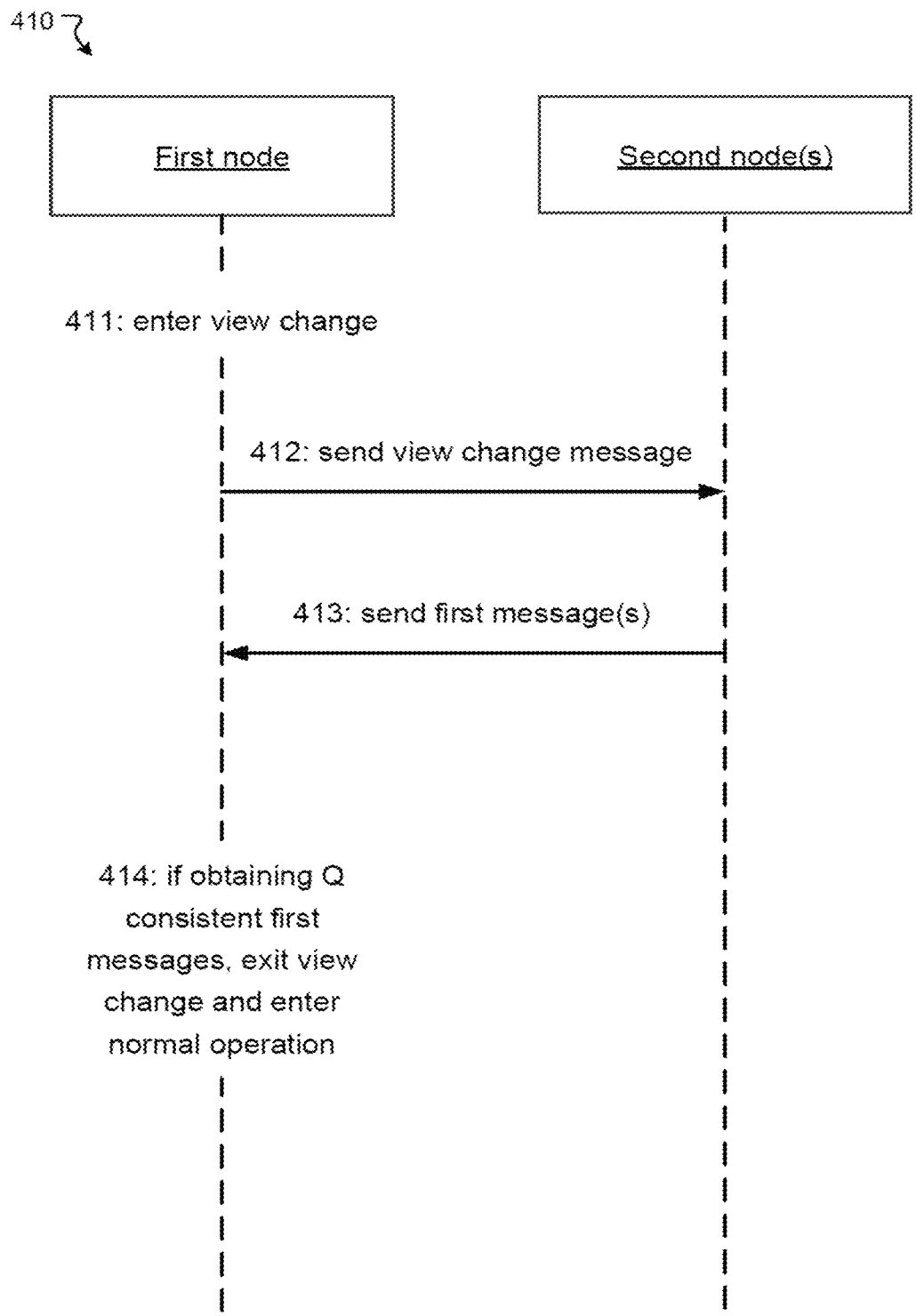
FIG. 4 illustrates a flow chart of view change exiting steps, in accordance with various embodiments.

FIG. 4 illustrates a flowchart of view change exiting steps 410, according to various embodiments of this specification. The steps 410 may be implemented by one or more components of the system 112 of FIG. 1 (e.g., node 0, node 1, node 2, . . . , or node i described above or a similar device, or a combination of any of the nodes and one or more additional devices such as node A). The steps 410 may be implemented by one or more blockchain nodes (e.g., primary node, backup node). The primary node and backup node may be those defined in the PBFT model. The steps 410 may be implemented by a view change system or device (e.g., computer, server) comprising various hardware machine and/or software. For example, the view change exiting system or device may comprise one or more processors and one or more non-transitory computer-readable storage media (e.g., one or more memories) coupled to the one or more processors and configured with instructions executable by the one or more processors to cause the system or device (e.g., the processor) to perform the steps 410. The operations presented below are intended to be illustrative. Depending on the implementation, the operations may include additional, fewer, or alternative steps performed in various orders or in parallel.

At step 411, a first node (e.g., a backup node) may enter a view change protocol. At step 412, the first node may multicast a view change message. To enter view change, the first node ends the normal operation protocol and enters the view change phase of the view change protocol described above. In one embodiment, the first node may enter the view change protocol by multicasting the view change message. For example, the first node may multicast the view change message to the primary node and other backup nodes. The first node may determine that the primary node is faulty or otherwise non-functioning and start multicasting the view change message according to the view change protocol.

The primary node and the (N-1) backup nodes may form a PBFT consensus system. Here, the primary node may or may not be truly non-functioning. If the primary node is truly non-functioning, a majority of backup nodes (e.g., Q backup nodes) may each enter the view change protocol and each multicast a view change message. When the first node obtains Q view change messages, it can determine that the majority of nodes have reached a consensus that the primary node is non-functioning and a new primary node needs to be elected. The rest of the view change protocol may follow. However, if the primary node is still functioning, the first node may end the view change protocol according the following steps. For such cases, the first node may have entered view change due to mistake, unstable connection, and/or other reasons, which cause a delay in sending and/or receiving the pre-prepare message, prepare message(s), or commit message(s) described earlier.

At step 413, the second node(s) may each multicast a first message. In some embodiments, the second node(s) may be still in the normal operation protocol and executing the above-described procedures (e.g., receiving pre-prepare message, multicasting prepare message, receiving prepare messages, multicast commit message, receiving commit messages, etc.). In the normal operation protocol, the second node(s) may each send a first message to the first node or multicast the first message so that the first node can obtain the first message. In some embodiments, the first message may be included in the commit message multicast in the commit phase. In other embodiments, the first message may be appended to the commit message multicast in the commit phase. In yet other embodiments, the first message may be sent or multicast independently, for example, after the commit message is multicast.

In one embodiment, the first message may include a current view and a current sequence number both known to the second node. The current view may indicate which of the nodes is known to the second node as the primary node. The current sequence number may indicate (1) a sequence number of the latest request (e.g., transaction request) committed by the second node in the commit phase, or (2) a block height indicating the latest block committed by the second node in the commit phase. The block height may be based on the number of blocks in the blockchain. For example, the height of a block may be the number of blocks in the chain between it and the genesis block). The very first block in the blockchain may have a block height of 0, the next block may have a block height of 1, and so forth. This example is not intended to limit the way of representing the block height, which can have other types of representation as long as indicating a serial number of the block in the blockchain. Optionally, the first message may also comprise a digest of the latest request or of the latest block.

At step 414, the first node may obtain the first messages respectively from the second nodes. Responsive to obtaining Q or more consistent first messages, the first node may end the view change protocol to enter the normal operation protocol. The Q or more first messages mean that at least Q nodes agree to a consistent "view" and "sequence number." The consistent "view" and "sequence number" indicate that the majority of the nodes are functioning normally in their normal operation protocols as they have successfully consensus-verified one or more transactions for the request or block. If the first node does not obtain Q first messages with consistent views and sequence numbers, the first node may remain in the view change protocol.

In some embodiments, the current sequence number known to the Q or more second nodes is larger than the first sequence number known by the first node (e.g., larger by one). This indicates that the majority of the nodes have completed one round of consensus verification of a request or a block, which was missed by the first node. Thus, the first node receiving the at least Q first messages may know through the consistent first messages that the majority of the nodes are still in normal operation.

In some embodiments, the first node may enter normal operation based at least on the current view. For example, upon exiting the view change, the first node may enter the normal operation protocol using the current view as its own view. The first node may also synchronize its copy of blockchain with the latest copy of the blockchain by incorporating the information (e.g., the digest) of the latest block. Thus, the first node may resume the normal operation protocol with the correct view and updated copy of blockchain. Further, the time it takes for the first node to resume normal operation from entering view change may be predicted. Because the height of the blockchain increases with a new block being added, the first node can discover its mistake by the time one new block is added to the blockchain since the first node entered view change and missed the consensus verification of the new block. Thus, the time it takes to resume normal operation may be less than the time for completing one round of consensus verification.

As such, a node that entered view change can efficiently end the view change protocol through an alternative pathway and rejoin other normally operating nodes. This pathway can be useful to nodes that entered view change, for example, due to mistake, unstable connection, and/or other reasons. This pathway circumvents the traditional view change protocol, which requires Q nodes to agree to view change in order to change the primary node and resume normal operation. Thus, overall network resources can be more efficiently utilized by ensuring a maximum number of nodes at normal operation.

FIG. 5A illustrates a flowchart of a view change method 510, according to various embodiments of this specification. The method 510 may be implemented by one or more components of the system 112 of FIG. 1 (e.g., node 0, node 1, node 2, . . . , or node i described above or a similar device, or a combination of any of the nodes and one or more additional devices such as node A). The method 510 may be implemented by one or more blockchain nodes (e.g., a backup node in a PBFT system). The primary node and backup node may be those defined in the PBFT model. The method 510 may be implemented by a view change system or device (e.g., computer, server) comprising various hardware machine and/or software. For example, the view change system or device may comprise one or more processors and one or more non-transitory computer-readable storage media (e.g., one or more memories) coupled to the one or more processors and configured with instructions executable by the one or more processors to cause the system or device (e.g., the processor) to perform the method 510. The operations of method 510 presented below are intended to be illustrative. Depending on the implementation, the method 510 may include additional, fewer, or alternative steps performed in various orders or in parallel. Further details of the method 510 can be referred to FIG. 1 to FIG. 4 and related descriptions above. The method 510 may be performed by a first node.

In various embodiments, the method 510 may be a computer-implemented view change method to be implemented on a blockchain maintained by a number (N) of nodes (e.g., nodes of a PBFT consensus system). In one embodiment, the N nodes form a Practical Byzantine Fault Tolerance (PBFT) network, in which one of the N nodes acts as the primary node and the other (N-1) nodes act as backup nodes. The method 510 may be performed by a first node (e.g., backup node) of the N nodes that is in a view change protocol.

In some embodiments, before block 511, the first node may have entered view change. As entering view change, the first node may multicast a view change message to the other nodes. For example, the first node may be a backup node and may multicast the view change message to the primary node and other backup nodes. The primary node and the backup nodes may form a PBFT consensus system. The view change message indicates that the first node has exited its normal operation protocol and entered a view change protocol. If the first node does not receive (Q-1) similar view change messages from other nodes (so obtaining a total of Q consistent view change messages including its own view change message), the threshold for the traditional view change protocol will not be met. Regardless, the following steps may allow the first node to end the view change protocol and enter the normal operation protocol.

Block 511 includes: obtaining, respectively from at least Q second nodes of the N nodes, at least Q first messages each comprising (1) a consistent current view known to the second node indicating a primary node designated among the N nodes and (2) a consistent current sequence number known to the second node, the current sequence number associated with a latest block or a latest transaction committed by the second node, wherein the current sequence number is larger than a first sequence number known to the first node (e.g., larger by one), Q (quorum) is (N+F+1)/2 rounded up to the nearest integer, and F is (N−1)/3 rounded down to the nearest integer. N can be any integer no less than four. In some embodiments, when N is at least (3F+1), Q is (2F+1). The current sequence number associated with the latest transaction may comprise, for example, a sequence number of one or more latest transactions committed by the corresponding second node. The current sequence number associated with the latest block may comprise, for example, a height of a copy of the blockchain maintained by the corresponding second node. As described earlier, the height of the blockchain may depend on the number of blocks in the blockchain and increase with an addition of the latest block. In one embodiment, for the first node to end view change, the at least Q first messages may include consistent current views and consistent current sequence numbers. Block 512 includes, responsive to obtaining the at least Q first messages, ending the view change protocol.

In some embodiments, the term "transaction" may be implemented via a blockchain system and recorded to the blockchain. The transaction may include, for example, a financial transaction, a blockchain contract transaction for deploying or invoking a blockchain contract, a transaction that updates a state (e.g., world state) of the blockchain, etc. The transaction does not have to involve a financial exchange.

In some embodiments, obtaining the at least Q first messages comprises: obtaining, respectively from the at least Q second nodes, at least Q commit messages indicating that the at least Q second nodes agree upon a next block to add to the blockchain, the Q commit messages respectively comprising the Q first messages. For example, the commit message may comprise the current view and current sequence number.

In other embodiments, obtaining the at least Q first messages comprises: obtaining, respectively from the at least Q second nodes, at least Q commit messages indicating that the at least Q second nodes agree upon a next block to add to the blockchain, the Q first messages respectively appended to the Q commit messages. For example, the first message may be sent or multicast with the commit message by the second node.

In various embodiments, the current view for the at least Q second nodes is v; and when in the view change protocol, the first node has a first view larger than v. For example, the first and second nodes may all have view v before the first node entered view change, but then the first node suspected that the first node was non-functioning and has entered view change with view v+1, while the second nodes are still at view v.

In some embodiments, the current sequence number comprises a height of a second copy of the blockchain (also known as block height) maintained by the second node; and the first sequence number comprises a height of a first copy of the blockchain maintained by the first node. In one embodiment, the current sequence number known to the at least Q second nodes is (n+1); and the first sequence number known to the first node is n. For example, before the first node entered view change, the first and second nodes may all have started with a blockchain of block height of 99 (that is, 100 blocks in the blockchain) in view v. After the first node entered the view change protocol before entering the commit phase (e.g., multicasting a commit message) and thus dropped out of the consensus verification, the second nodes have reached a consensus on the $101^{th}$ block and thereby increased the block height to 100. The $101^{th}$ block unknown to the first node stuck in the view change protocol may cause the difference between the current sequence number (100L) and the first sequence number (99).

In other embodiments, the current sequence number comprises a sequence number of the latest transaction committed by the second node; and the first sequence number comprises a sequence number of a latest transaction committed by the first node. In one embodiment, the current sequence number known to the at least Q second nodes is (n+1); and the first sequence number known to the first node is n. For example, before the first node entered view change, the first and second nodes may all have started with 80 requests (e.g., transaction requests) for consensus verification. The requests may be assigned increasing sequence numbers. In view v, the first and second nodes may have consensus-verified 50 requests. After the first node entered the view change protocol before entering the commit phase (e.g., multicasting a commit message) and thus dropped out of the consensus verification, the second nodes have reached a consensus on the $51^{st}$ request and thereby increased the sequence number of a next pending request to 52. The $51^{st}$ request as being consensus verified is unknown to the first node stuck in the view change protocol and may cause the difference between the current sequence number (51) and the first sequence number (50).

In some embodiments, the first message further comprises a digest of the latest block or the latest transaction. The digest (e.g., a hash value) may be the numeric result of applying a hash algorithm to the data such as the transactions. In one embodiment, the digest comprises a hash value of the latest block or the latest transaction. In one example, the digest comprises a transaction hash of the latest transaction committed by the second node but not committed by the first node. In another example, the digest comprises transaction hashes of latest transactions committed by the second node but not committed by the first node. In another example, the digest comprises a Merkle root of the latest block known to the second node but unknown to the first node. In another example, the digest comprises Merkle roots of latest blocks known to the second node but unknown to the first node.

In some embodiments, the "view," "sequence number," and/or "digest" may be included in the first message as one or more digital signatures (or signatures for short). The first message comprises a digital signature certifying the current view and the current sequence number both known to the second node. The "signature" shows endorsement from the entity that sent the corresponding message. The term "signature" can be any form of indication of approval. In one embodiment, the "view" "sequence number" and/or "digest" may be first input to a one-way hash function, the output hash value of which is encrypted with the corresponding node's private key to obtain the digital signature. The encryption may be achieved through various ways such as Public-Private Key Encryption (also known as asymmetric cryptography), Digital Signature Algorithm (DSA) such as Elliptic Curve Digital Signature Algorithm (ECDSA), etc. For example, using a public key algorithm, such as RSA, one can generate two keys that are mathematically linked: one private and one public. Digital signatures work because public key cryptography depends on two mutually authenticating cryptographic keys. The node creating the digital signature may use its own private key to encrypt "view," "sequence number," and/or "digest"; the only way to decrypt that data is with the signer node's public key. Thus, the digital signature can represent the "view," "sequence number," and/or "digest" known to the corresponding node.

In some embodiments, ending the view change protocol comprises: synchronizing a first copy of the blockchain maintained by the first node with a second copy of the blockchain maintained by the second node; and exiting the view change protocol to enter a normal operation protocol using the consistent current view for the first node. Thus, if the second nodes are in view v and the first node was stuck in view (v+1), the first node can end the view change protocol and enter the normal operation protocol in view v.

Figure 5B:
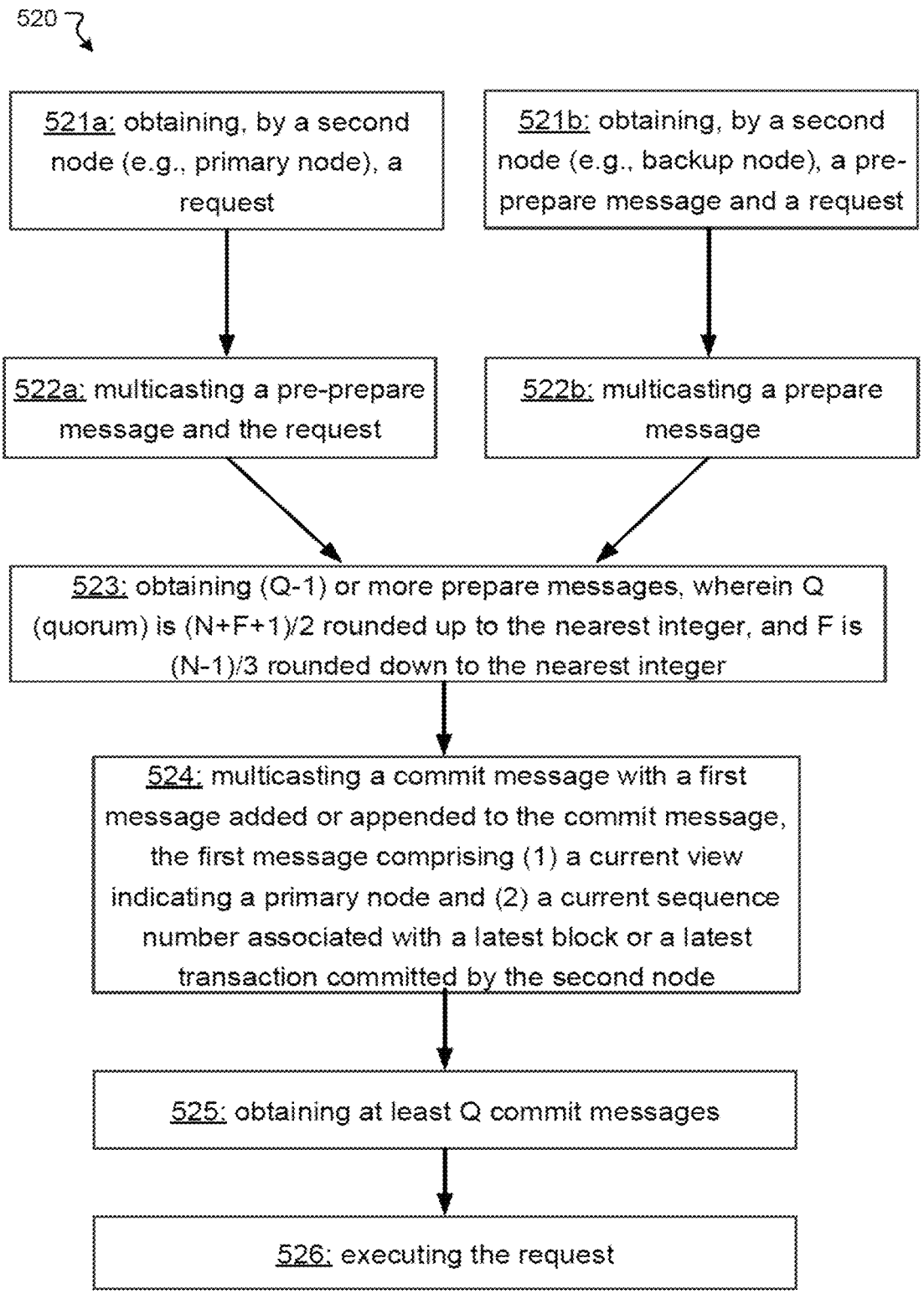
FIG. 5B illustrates a flow chart of a view change method, in accordance with various embodiments.

FIG. 5B illustrates a flowchart of a view change method 520, according to various embodiments of this specification. The method 520 may be implemented by one or more components of the system 112 of FIG. 1 (e.g., node 0, node 1, node 2, . . . , or node i described above or a similar device, or a combination of any of the nodes and one or more additional devices such as node A). The method 520 may be implemented by one or more blockchain nodes (e.g., a primary node or a backup node in a PBFT system). The primary node and backup node may be those defined in the PBFT model. The method 520 may be implemented by a view change system or device (e.g., computer, server) comprising various hardware machine and/or software. For example, the view change system or device may comprise one or more processors and one or more non-transitory computer-readable storage media (e.g., one or more memories) coupled to the one or more processors and configured with instructions executable by the one or more processors to cause the system or device (e.g., the processor) to perform the method 520. The operations of method 520 presented below are intended to be illustrative. Depending on the implementation, the method 520 may include additional, fewer, or alternative steps performed in various orders or in parallel. Further details of the method 520 can be referred to FIG. 1 to FIG. 4 and related descriptions above. The method 520 may be performed by a second node. If the second node is a primary node, the second node may perform steps 521a, 522a, 523, 524, 525, and 526. If the second node is a backup node, the second node may perform steps 521b, 522b, 523, 524, 525, and 526.

Block 521a includes obtaining, by a second node (e.g., a primary node), one or more requests (e.g., transaction requests). The request may involve a blockchain transaction (with or without a smart contract) for consensus verification. In one example, the requests may correspond to transactions to be consensus-verified and added to the blockchain. The consensus verification may be performed during the execution of one round of normal operation protocol. Alternatively, the requests may correspond to other operations. In some embodiments, a primary node may obtain the request from a client (e.g., a lightweight node) or from a backup node that obtained the request from the client and forwarded the request to the primary node.

Block 522a includes multicasting a pre-prepare message and the requests to the backup nodes. In some embodiments, after obtaining multiple requests, the second node may multicast the pre-prepare message and the requests to each of the backup nodes. The pre-prepare message may include an order for the requests (e.g., an order for transactions associated with the requests). The order may comprise the sequence number for each request and/or the sequence number for the next block to add to the blockchain.

Block 521b includes obtaining, by the second node (e.g., a backup node), a pre-prepare message and the one or more requests. For example, the pre-prepare message and the requests may be obtained by a backup node from a primary node. Similarly, the backup node may obtain the pre-prepare message and requests with the order for executing the requests.

Block 522b includes multicasting a prepare message if the second node accepts the pre-prepare message. Multicast may mean broadcast. For example, the prepare message may be multicast by a backup node to the primary node and other backup nodes.

Block 523 includes obtaining (Q-1) or more prepare messages. In some embodiments, Q (quorum) is (N+F+1)/2 rounded up to the nearest integer, and F is (N−1)/3 rounded down to the nearest integer, representing a maximum number of non-functioning nodes allowed among the N nodes to keep a consensus system of the N nodes functioning. Obtaining (Q-1) or more prepare messages may be a condition to be met before entering the commit phase. The (Q-1) or more prepare messages may include the corresponding node's own multicast prepare message.

Block 524 includes multicasting to other nodes a commit message comprising (1) a current view indicating a primary node known to the second node and (2) a current sequence number known to the second node. In some embodiments, the multicast commit message comprises one or more digital signatures encrypting the current view and the current sequence number.

In some embodiments, the commit message further comprises a digest of one or more transactions associated with the request. For example, the digest may comprise a transaction hash of a latest committed transaction or a Merkle Trie root of a latest block of the blockchain.

In some embodiments, the second node has not entered view change; and the current sequence number known to the second node is larger than a first sequence number known to a first node that has entered view change (e.g., by one).

In some embodiments, up to F nodes may be non-functioning. Despite that, the described method and consensus verification can be properly carried out, as the PBFT system tolerates up to F non-functioning nodes.

Block 525 includes obtaining at least Q commit messages. The Q commit messages may include the corresponding node's own multicast commit message.

Block 526 includes executing the one or more requests. For example, the one or more requests may be consensus-verified and correspondingly added to the local copies of the blockchain. As a result, if enough nodes (e.g., Q nodes) have verified the corresponding transaction, the transaction is packed into the blockchain.

Figure 6:
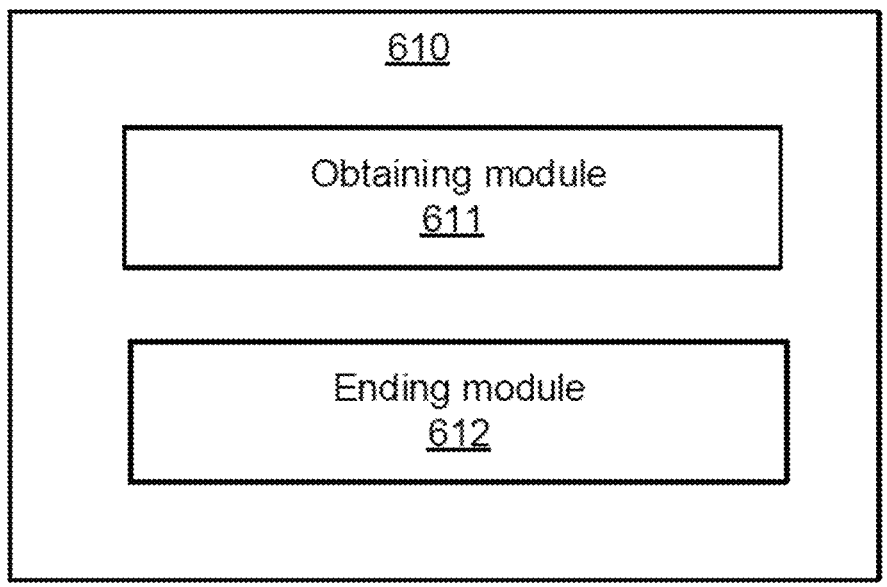
FIG. 6 illustrates a block diagram of a view change system, in accordance with various embodiments.

FIG. 6 illustrates a block diagram of a view change system 610, in accordance with various embodiments. The view change system 610 (e.g., a computer system) may be an example of an implementation of node 0, node 1, node 2, . . . , or node i described above or a similar device, or a combination of any of the nodes and an additional device (e.g., node A). The method 510 may be implemented by the view change system 610. The view change system 610 may comprise one or more processors and one or more non-transitory computer-readable storage media (e.g., one or more memories) coupled to the one or more processors and configured with instructions executable by the one or more processors to cause the system or device (e.g., the processor) to perform the method 510. The view change system 610 may comprise various units/modules corresponding to the instructions (e.g., software instructions).

In some embodiments, the view change system 610 may be referred to as a view change apparatus. The view change apparatus may be for maintaining a blockchain, wherein a number (N) of nodes maintain the blockchain with one of the N nodes acting as a primary node and the other (N-1) nodes acting as backup nodes, the view change apparatus acting as a first node of the N nodes that is in a view change protocol. The view change apparatus may comprise one or more processors and one or more non-transitory computer-readable memories coupled to the one or more processors and configured with instructions executable by the one or more processors to cause the apparatus to perform operations. The view change apparatus may comprise various units/modules corresponding to the instructions (e.g., software instructions). The view change apparatus may comprise an obtaining module 611 for obtaining, respectively from at least Q second nodes of the N nodes, at least Q first messages each comprising (1) a consistent current view known to the second node indicating a primary node designated among the N nodes and (2) a consistent current sequence number known to the second node, the current sequence number associated with a latest block or a latest transaction committed by the second node, wherein the current sequence number is larger than a first sequence number known to the first node, Q (quorum) is (N+F+1)/2 rounded up to the nearest integer, and F is (N−1)/3 rounded down to the nearest integer; and an ending module 612 for, responsive to obtaining the at least Q first messages, ending the view change protocol.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some embodiments, the instructions described herein may be implemented in a virtual machine on the special-purpose computing device. When executed, the instructions may cause the special-purpose computing device to perform various methods described herein. The virtual machine may include a software, hardware, or a combination thereof. For example, the virtual machine may include an Ethereum Virtual Machine (EVM) software that provides the runtime environment for smart contracts in Ethereum.

Figure 7:
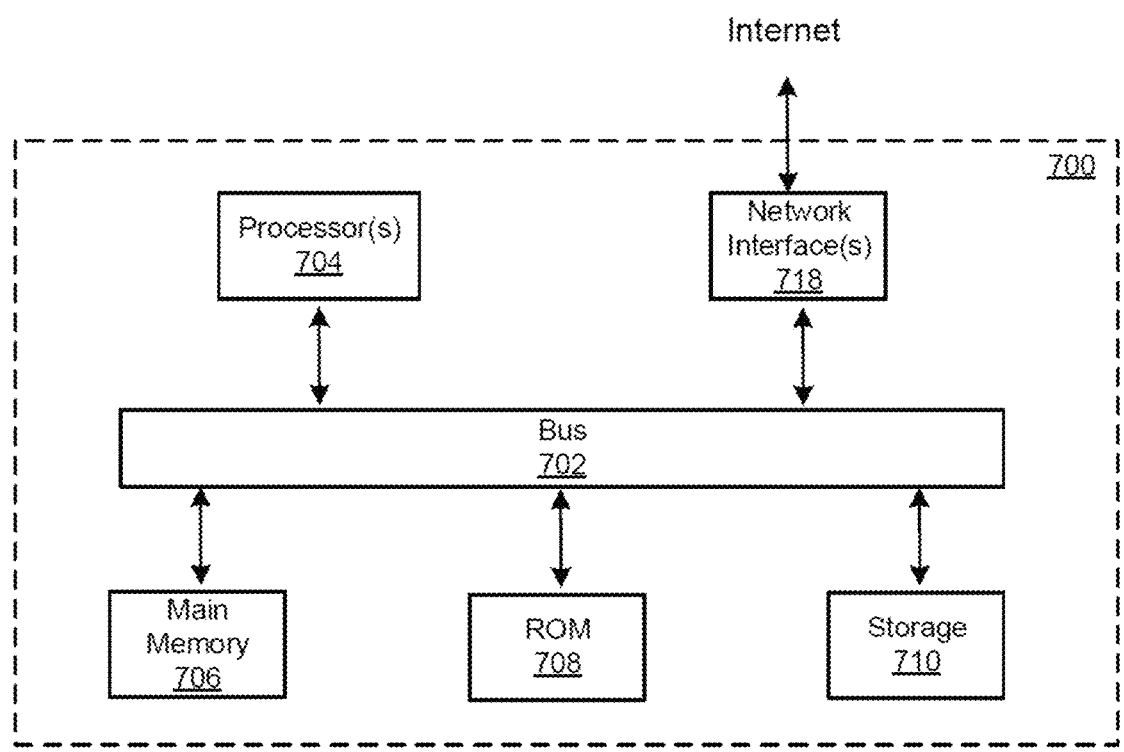
FIG. 7 illustrates a block diagram of a computer system in which any of the embodiments described herein may be implemented.

FIG. 7 is a block diagram that illustrates a computer system 700 upon which any of the embodiments described herein may be implemented. The system 700 may perform any of the methods described herein (e.g., the view change method 510, the view change method 520). The system 700 may be implemented in any of the systems described herein (e.g., the view change system 610). The system 700 may be implemented in any of the nodes described herein and configured to perform corresponding steps for implementing blockchain contract. The computer system 700 includes a bus 702 or other communication mechanism for communicating information, one or more hardware processor(s) 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions executable by processor(s) 704. Main memory 706 also may be used for storing temporary variables or other intermediate information during execution of instructions executable by processor(s) 704. Such instructions, when stored in storage media accessible to processor(s) 704, render computer system 700 into a special-purpose machine that is customized to perform the operations specified in the instructions. The computer system 700 further includes a read only memory (ROM) 708 or other static storage device coupled to bus 702 for storing static information and instructions for processor(s) 704. A storage device 710, such as a magnetic disk, optical disk, or USB thumb drive (Flash drive), etc., is provided and coupled to bus 702 for storing information and instructions.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the operations, methods, and processes described herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor (s) 704 to perform the process steps described herein. In alternative embodiments, hard-wired circuitry may be used in place of or in combination with software instructions.

The main memory 706, the ROM 708, and/or the storage device 710 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 700 also includes a network interface 718 coupled to bus 702. Network interface 718 provides a two-way data communication coupling to one or more network links that are connected to one or more local networks. For example, network interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicate with a WAN). Wireless links may also be implemented. In any such implementation, network interface 718 sends and receives electrical, electromagnetic or optical signals that carry digital data streams representing various types of information.

The computer system 700 can send messages and receive data, including program code, through the network(s), network link and network interface 718. In the Internet example, a server might transmit a requested code for an application program through the Internet, the ISP, the local network and the network interface 718.

The received code may be executed by processor(s) 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner. Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned.

Although an overview of the subject matter has been described with reference to specific embodiments, various modifications and changes may be made to these embodiments without departing from the broader scope of embodiments of the this specification. The Detailed Description should not to be taken in a limiting sense, and the scope of various embodiments is defined only by the appended claims, along with the full range of equivalents to which such claims are entitled.

The invention claimed is:

1. A computer-implemented view change method to be implemented on a blockchain maintained by a number (N)

of nodes, the method performed by a node of the N nodes that is not in view change (a second node), the method comprising:
- obtaining (Q-1) or more prepare messages for executing a request, wherein Q (quorum) is (N+F+1)/2 rounded up to the nearest integer, and F is (N−1)/3 rounded down to the nearest integer;
- multicasting to a plurality of other nodes of the N nodes a commit message comprising (1) a current view indicating a primary node known to the second node and (2) a current sequence number known to the second node, for a node of the plurality of other nodes that is in view change (a first node) to end view change;
- obtaining at least Q commit messages from Q of the N nodes; and
- executing the request and adding a result of the execution to the blockchain.

2. The method of claim 1, wherein:
the N nodes comprise the primary node and a plurality of backup nodes;
the second node is the primary node; and
before obtaining the (Q-1) or more prepare messages, the method further comprises: obtaining the request, and multicasting a pre-prepare message and the request to one or more of the plurality backup nodes.

3. The method of claim 1, wherein:
the N nodes comprise the primary node and a plurality of backup nodes;
the second node is one of the plurality of backup nodes; and
before obtaining the (Q-1) or more prepare messages, the method further comprises: obtaining the request and a pre-prepare message multicast by the primary node, and multicasting a prepare message to one or more of primary node and the plurality backup nodes.

4. The method of claim 1, wherein:
the current sequence number is associated with a latest block or a latest transaction committed by the second node.

5. The method of claim 4, wherein:
each of the Q commit messages comprises a digest of one or more transactions associated with the request; and
the digest comprises a transaction hash of the latest transaction committed by the second node or a Merkle Trie root of the latest block of the blockchain known to the second node but unknown to the first node.

6. The method of claim 1, wherein:
the current sequence number known to the second node is larger than a first sequence number known to the first node that has entered view change.

7. The method of claim 6, wherein:
the current sequence number comprises a height of a second copy of the blockchain maintained by the second node; and
the first sequence number comprises a height of a first copy of the blockchain maintained by the first node.

8. The method of claim 6, wherein:
the current sequence number comprises a sequence number of a latest transaction committed by the second node; and
the first sequence number comprises a sequence number of a latest transaction committed by the first node.

9. The method of claim 6, wherein:
the first node is configured to end view change upon obtaining, respectively from at least Q second nodes, at least Q commit messages, the Q commit messages indicating that the at least Q second nodes agree upon a next block to add to the blockchain.

10. The method of claim 9, wherein:
the N nodes form a Practical Byzantine Fault Tolerance (PBFT) network, in which one of the N nodes acts as the primary node and the other (N-1) nodes act as backup nodes;
the current sequence number known to the at least Q second nodes is (n+1);
the first sequence number known to the first node is n;
the current view for the at least Q second nodes is v; and
when in view change, the first node has a view larger than v.

11. A view change system for maintaining a blockchain, wherein a number (N) of nodes maintain the blockchain, the system acting as a node of the N nodes that is not in view change (a second node), the system comprising one or more processors and one or more non-transitory computer-readable memories coupled to the one or more processors and configured with instructions executable by the one or more processors to cause the system to perform operations comprising:
- obtaining (Q-1) or more prepare messages for executing a request, wherein Q (quorum) is (N+F+1)/2 rounded up to the nearest integer, and F is (N−1)/3 rounded down to the nearest integer;
- multicasting to a plurality of other nodes of the N nodes a commit message comprising (1) a current view indicating a primary node known to the second node and (2) a current sequence number known to the second node, for a node of the plurality of other nodes that is in view change (a first node) to end the view change;
- obtaining at least Q commit messages from Q of the N nodes; and
- executing the request and adding a result of the execution to the blockchain.

12. The system of claim 11, wherein:
the N nodes comprise the primary node and a plurality of backup nodes;
the second node is the primary node; and
before obtaining the (Q-1) or more prepare messages, the operations further comprise: obtaining the request, and multicasting a pre-prepare message and the request to one or more of the plurality backup nodes.

13. The system of claim 11, wherein:
the N nodes comprise the primary node and a plurality of backup nodes;
the second node is one of the plurality of backup nodes; and
before obtaining the (Q-1) or more prepare messages, the operations further comprise: obtaining the request and a pre-prepare message multicast by the primary node, and multicasting a prepare message to one or more of primary node and the plurality backup nodes.

14. The system of claim 11, wherein:
the current sequence number known to the second node is larger than a first sequence number known to the first node that has entered view change.

15. The system of claim 11, wherein:
the current sequence number is associated with a latest block or a latest transaction committed by the second node.

16. A non-transitory computer-readable storage medium for maintaining a blockchain, wherein a number (N) of nodes maintain the blockchain, the storage medium being associated with a node of the N nodes that is not in view change (a second node), the storage medium configured with instructions executable by one or more processors to cause the one or more processors to perform operations comprising:

obtaining (Q-1) or more prepare messages for executing a request, wherein Q (quorum) is (N+F+1)/2 rounded up to the nearest integer, and F is (N−1)/3 rounded down to the nearest integer;

multicasting to a plurality of other nodes of the N nodes a commit message comprising (1) a current view indicating a primary node known to the second node and (2) a current sequence number known to the second node, for a node of the plurality of other nodes that is in view change (a first node) to end the view change;

obtaining at least Q commit messages from Q of the N nodes; and executing the request and adding a result of the execution to the blockchain.

17. The storage medium of claim 16, wherein:
the N nodes comprise the primary node and a plurality of backup nodes;
the second node is the primary node; and
before obtaining the (Q-1) or more prepare messages, the operations further comprise: obtaining the request, and multicasting a pre-prepare message and the request to one or more of the plurality backup nodes.

18. The storage medium of claim 16, wherein:
the N nodes comprise the primary node and a plurality of backup nodes;
the second node is one of the plurality of backup nodes; and
before obtaining the (Q-1) or more prepare messages, the operations further comprise: obtaining the request and a pre-prepare message multicast by the primary node, and multicasting a prepare message to one or more of primary node and the plurality backup nodes.

19. The storage medium of claim 16, wherein:
the current sequence number known to the second node is larger than a first sequence number known to the first node that has entered view change.

20. The storage medium of claim 16, wherein:
the current sequence number is associated with a latest block or a latest transaction committed by the second node.

* * * * *